V BELT SPEED CHANGER
Filed Oct. 18, 1950 2 Sheets-Sheet 1
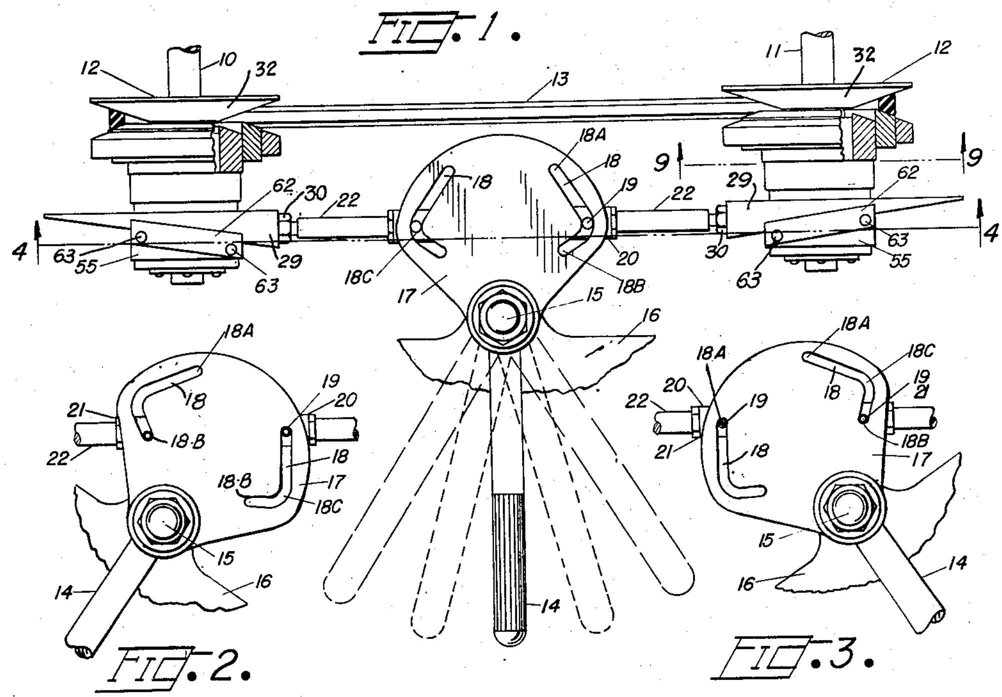
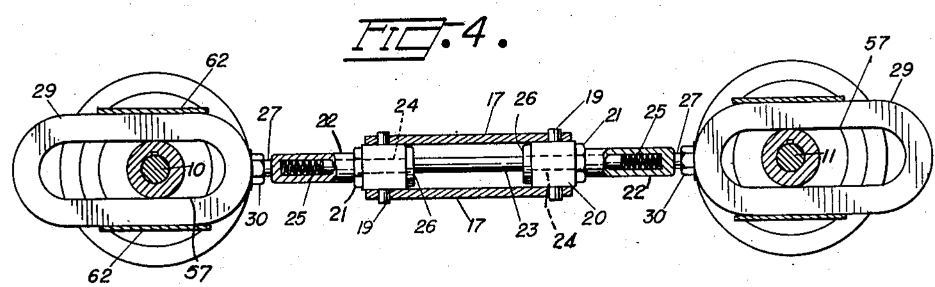
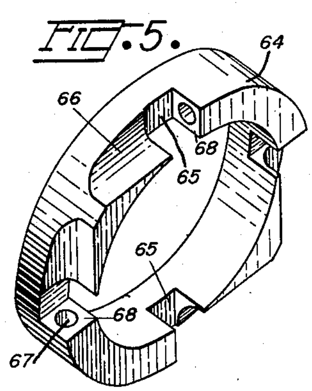
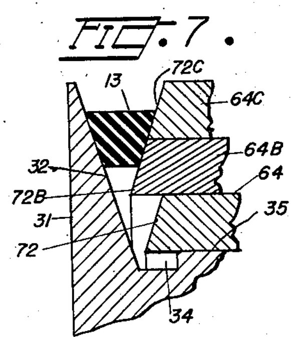
FIG. 6.
71
70
69
INVENTOR
James D. Arata
BY E. B. Birkenbeuel
ATTORNEY V BELT SPEED CHANGER
Filed Oct. 18, 1950 2 Sheets-Sheet 2
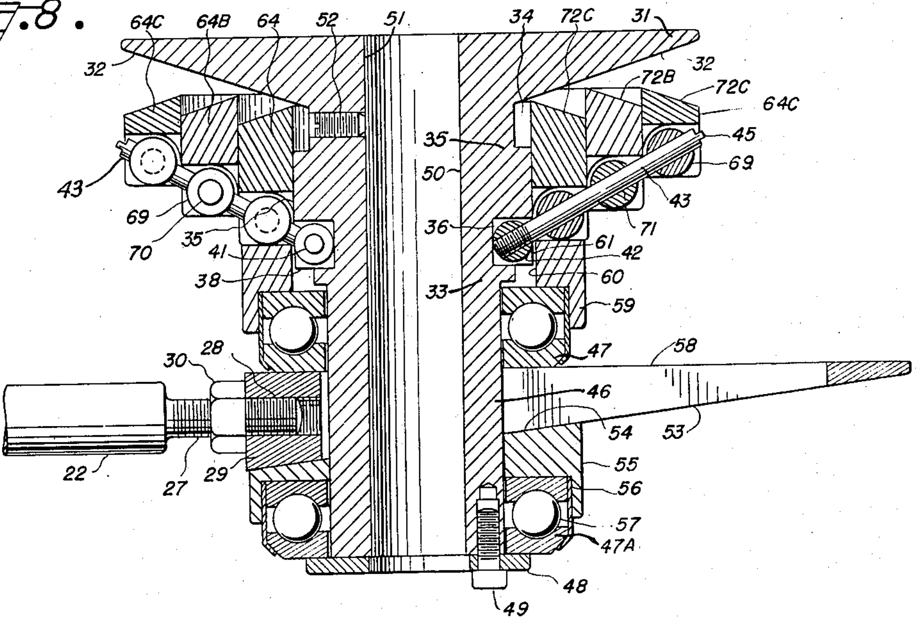
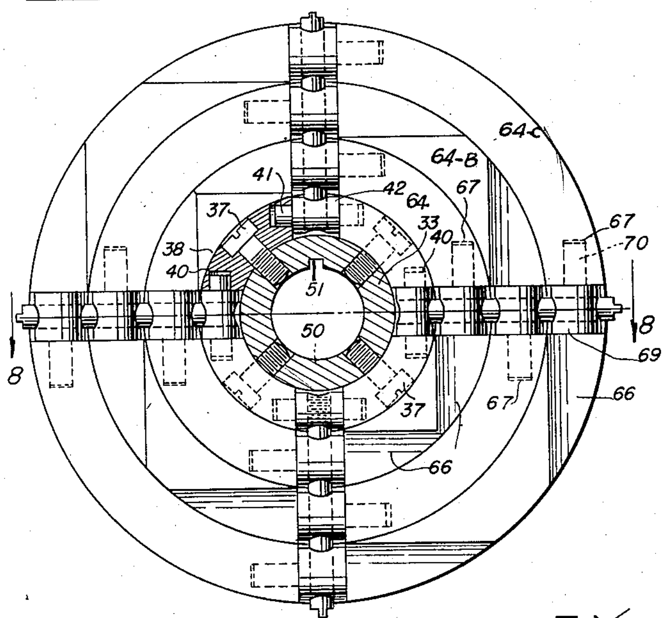
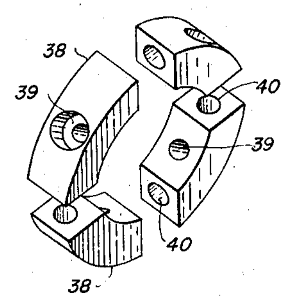
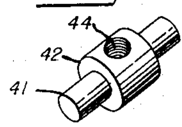
INVENTOR
James D. Arata
BY [signature]
ATTORNEY United States Patent Office 2,702,484

Patented Feb. 22, 1955

2,702,484

V-BELT SPEED CHANGER

James D. Arata, Milwaukie, Oreg.

Application October 18, 1950, Serial No. 190,722

2 Claims. (Cl. 74—230.17)

This invention relates generally to speed changing devices and particularly to that class of devices employing a V-belt drive.

The main object of this invention is to construct a V-belt speed changer in which it is possible to obtain a wide range of speed ratios.

The second object is to construct a speed changer in which the speed changes are easily and smoothly made without stopping either pulley.

The third object is to so construct the drive that the correct relationship is maintained between the lateral belt faces and the engaging faces of the pulleys and that the best tension be held uniform at all speeds.

I accomplish these and other objects in the manner set forth in the following specification as illustrated by the accompanying drawings, in which:

Fig. 1 is a general plan view with portions of the belt and pulleys broken away in section.

Fig. 2 is a fragmentary section showing the operating lever in one extreme position of travel.

Fig. 3 is a view similar to Fig. 2 but showing the lever in the opposite extreme position of travel.

Fig. 4 is a section taken along the line 4—4 in Fig. 1.

Fig. 5 is a perspective view of one of the belt engaging pulley rings.

Fig. 6 is a perspective view of a pivoted guide.

Fig. 7 is a fragmentary section showing the belt engaging two of the pulley rings.

Fig. 8 is a section taken along the line 8—8 in Fig. 9.

Fig. 9 is a section taken along the line 9—9 in Fig. 1.

Fig. 10 is a perspective view of the anchor blocks shown in the same relation they occupy in the assembled pulley.

Fig. 11 is a perspective view of one of the trunnions.

Like numbers of reference refer to the same or similar parts throughout the several views.

Referring in detail to the drawings, there is shown a driver shaft 10 and a driven shaft 11, upon which are mounted the identical pulley assemblies 12. A V-belt 13 imparts motion from the member 10 to the member 11.

In order to change the speed ratio between the members 10 and 11, there is provided a hand lever 14 which is mounted on a pivot bolt 15 upon some convenient portion of the machine frame 16.

Integral with the lever 14 are the plates 17 which are provided with the L-shaped slots 18 which are opposed to each other and have their ends 18–A more remote from the rounded corners 18–C than are the ends 18–B.

Pins 19, which project from the blocks 20, extend into the slots 18. Secured to the blocks 20 by means of the nuts 21 are the extensions 22 which are kept in alignment by means of the rod 23 upon which the extensions 22 can slide under the action of the lever 14. The rod 23 is a sliding fit in the holes 24.

Springs 25 are provided in the extensions 22 to urge the rod 23 toward a central position and prevent chattering.

Extensions 22 are provided with the shoulders 26 and a threaded end 27 which occupies the threaded hole 28 in the wedge 29. A lock nut 30 is provided to prevent movement after adjustment has been completed.

Referring to Fig. 1, the device is illustrated with the pulleys 12 at a one to one ratio at which position the pins 19 are spaced apart at their maximum distance. When the lever 14 is moved to one end of its travel, one pin 19 occupies an end 18–A while the other occupies the opposite end 18–B, at which time the pins 19 are spaced a shorter distance, which condition is necessary to maintain the belt tension at the various diameters. If the wedges 29 were connected with a solid rod and moved, the belt 13 would be tight at some speeds and loose at others.

The construction of each pulley assembly 12 is as follows: The flange 31 is provided with a conical surface 32 and an elongated hub 33 provided with an outer groove 34 at the inner part of the surface 32, to provide clearance for the belt 13 when running on its smaller radius. The hub 33 has an enlarged diameter 35 which provides a bearing seat for a part to be described later.

Groove 36 is formed around the hub 33 next to the enlarged portion 34 and has formed therein radial tapped holes to receive the screws 37, by means of which arcuate bearing blocks 38 (see Fig. 10) are secured within the groove 36. Counter-sunk holes 39 are provided for the screws 37 and the holes 40 are adapted to receive the trunnion ends 41 of the anchor block 42 to each of which is secured an actuating lever 43 having a threaded end which fits tightly into the threaded hole 44 and whose other end is provided with a short extension 45 to which a wrench may be applied.

The reduced diameter 46 of the hub 33 extends through the thrust bearings 47 and 47–A and wedge 29 and the retaining washer 48 is secured to the end of the hub 33 by means of the screws 49.

The central hole 50 is provided with a keyway 51 and a setscrew 52 is located within the groove 34 so that the full assembly 12 may be secured to the shaft 10 or 11.

Each wedge 29 has its sloping surface 53 in contact with the sloping surface 54 of a block 55 within whose recessed opening 56 is mounted the thrust bearing 47–A, while the central slot 57 slidably receives the part 46.

The side 58 of each wedge 29 contacts one end of the thrust bearing 47 which is recessed within the block 59 whose inner surface 60 clears the outer surface 61 of the blocks 38.

Plates 62 are secured to the blocks 55 by means of the screws 63 and the plates 62 extend over the edges of the wedge 29 and prevent the rotation of the block 55.

Changes in the relative diameters of the pulley assembly 12 is effected by means of rings 64, 64–B and 64–C as illustrated in Fig. 5, on one side of which are formed the radial slots 65, the tangential grooves 66 and holes 67 which are normal to the faces 68 of the slots 65. These holes are aligned with the grooves 66 and when assembled are in staggered relationship as shown in Fig. 9. The grooves 66 permit the easy assembly of the guide blocks 69 whose trunnions journal in the holes 67. The actuating lever 43 passes through the opening 71. In the operation of the device, when force is applied by means of the wedges 29 to the thrust bearing 47, it is transferred to the block 59 which in turn rides against the guide blocks 69 which are pivotally mounted in the ring 64. The actuating levers 43 are slidable in the guide blocks 69 but are hinged on the anchor blocks 42. Therefore, greater movement is imparted to the middle ring 64–B and still more movement to the outer ring 64–C. The movements of the various rings 64, 64–B and 64–C are such that the belt 13 is maintained at a fixed tension.

The purpose of the staggered pattern as illustrated in Fig. 9 is to offer resistance to the circumferential pull of the rings 64 on the levers 43 irrespective of which direction the pulleys may be rotating.

The ring 64 is also provided with a conical surface 72 which, together with the surface 32, form a V-groove for the belt 13.

Outside of the ring 64 is an intermediate ring 64–B which is somewhat shorter than the ring 64 but otherwise having the same openings 65, 66 and 67.

Outside of the ring 64–B is a still shorter ring 64–C, also similar as to the openings 65, 66 and 67.

It will be noted that in each hole 71 is a lever 43 and that for a given movement of the levers 43, there is an increase in movement in the next outer ring 64–B or 64–C.

Upon the withdrawal of the wedges 29 the rings 64, 64–B and 64–C move axially away from the surface 32 and the tension on the belt 13 will cause it to move inwardly to the smaller diameter.

At one point in this movement the surface 72–C of the ring 64–C will line up with the surface 72–B of the ring 64–B at which time the belt 13 will function as shown in Fig. 7.

Further retraction of the rings 64, 64–B and 64–C will gradually bring the belt 13 to the position shown in Fig. 1 and continued withdrawal will finally result in the belt operating on the smallest diameter of one of the assemblies 12.

It will be noted that the cam plates 17 have the slots 18 and 18–B formed therein and that these are not equal but differentiate from each other in a manner to change the diameter of both of the pulleys in unison, although not in equal ratio, in order that the tension on the pulley may be preserved without relying upon springs as is commonly the case.

I claim:

1. A V-belt speed changer of the class described having in combination two parallel axis units, each having an elongated hub having one side of a V-belt pulley formed at one end of said hub and having a plurality of telescopic rings slidably mounted on said hub, the edges of said rings adjacent to said pulley side being bevelled to form a belt engaging face on one side of said pulley, each of said rings having guide blocks rockably mounted therein, levers slidably mounted in all of said guide blocks and rockably anchored on said hub, a block slidable on said hub engaging the innermost ring, an anti-friction bearing mounted in said block, a second anti-friction bearing on said hub, a retaining washer on the end of said hub for holding said second bearing, a wedge block containing said second bearing, an elongated wedge between said first mentioned bearing and said wedge block, said wedge having a slot therein through which said hub extends, said actuating levers occupying planes passing radially through the axis of said hub, a connector for said wedges comprised of a rod, a block slidably mounted at each end of said rod, each block having an extension thereon in which said rod can slide, each extension containing a compression spring bearing against the end of said rod, each block having a lateral pin projecting therefrom, a differential cam receiving said pins, a hand lever for actuating said cams, and a V-belt connecting the two units.

2. A V-belt speed changer having in combination two parallel axis shaft units, each shaft having an elongated hub mounted thereon, each of said hubs having a flanged end, the inner face of which flange has one side of a V-belt pulley formed thereon, each hub having a plurality of telescopic rings slidably mounted thereon, the edges of said rings adjacent the pulley side of said flange being beveled to form a pulley face opposite the pulley face on said flange, each of said rings having slots formed around same, guide blocks rockably mounted in said slots, actuating levers slidably extending through all of said guide blocks and having the inner end of each lever hinged to said hub, a block slidable on said hub, engaging the innermost ring, an anti-friction bearing mounted in said block, a second anti-friction bearing on said hub spaced from said first mentioned bearing, a retaining washer secured to said hub forming a thrust means for said second bearing, a wedge block on said hub between said bearings and containing said second bearing, an elongated wedge disposed between the first mentioned bearing and said wedge block, said wedge having a slot therein through which said hub extends permitting longitudinal movement of said wedge, said actuating levers occupying planes passing radially through the axis of said hub, eccentric plate cams disposed between the two wedges, said plate cams having opposed right angled slots formed therein, a rod between said plate cams, blocks slidably mounted on said rod at opposite ends of said plate cams, pins on said blocks engaging said cam slots, means connecting said blocks to the respective elongated wedges in said two shaft units and a compression spring between each end of the rod and the respective connecting means.

References Cited in the file of this patent

UNITED STATES PATENTS

| | | |
|---|---|---|
| 1,235,794 | Hardaker | Aug. 7, 1917 |
| 1,993,131 | Borgna | Mar. 5, 1935 |
| 2,074,997 | Faltermeyer | Mar. 23, 1937 |
| 2,153,151 | Morella | Apr. 4, 1939 |
| 2,209,736 | Livingston | July 30, 1940 |
| 2,214,854 | Heyer | Sept. 17, 1940 |
| 2,256,312 | Cregier | Sept. 16, 1941 |
| 2,524,575 | Shaw | Oct. 3, 1950 |
| 2,589,897 | Turnbull | Mar. 18, 1952 |

FOREIGN PATENTS

| | | |
|---|---|---|
| 741,212 | France | Feb. 8, 1933 |